Nov. 22, 1932.   A. F. EDOUART   1,888,527
SHUTTLE PRESSURE PLATE
Filed Sept. 2, 1930   2 Sheets-Sheet 1
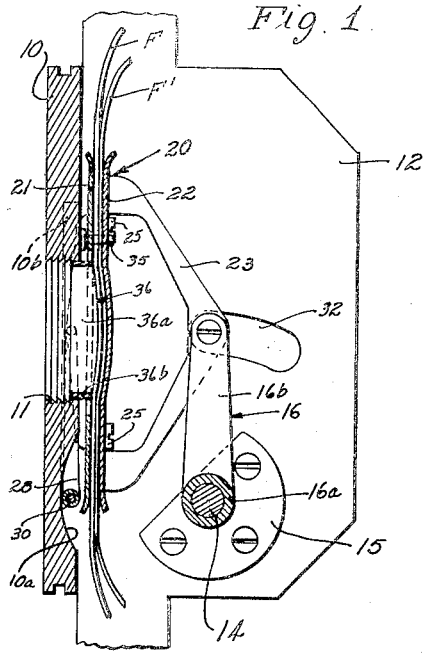
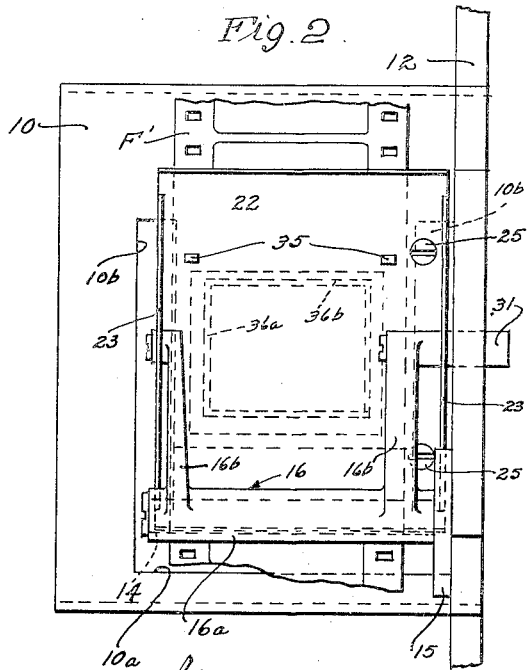
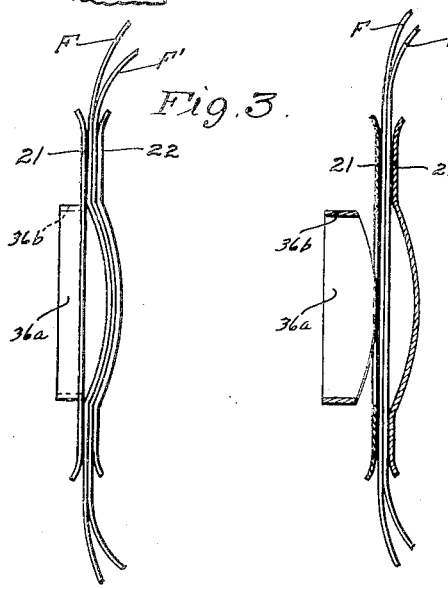
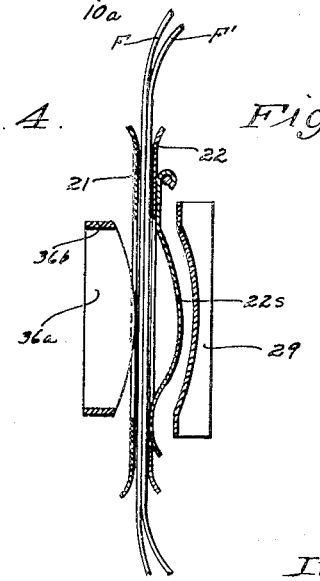
Inventor
Alexander Farciot Edouart
Attorney.

Nov. 22, 1932.    A. F. EDOUART    1,888,527
SHUTTLE PRESSURE PLATE
Filed Sept. 2, 1930    2 Sheets-Sheet 2

Inventor
Alexander Farciot Edouart

Attorney

Patented Nov. 22, 1932

1,888,527

UNITED STATES PATENT OFFICE

ALEXANDER FARCIOT EDOUART, OF LOS ANGELES, CALIFORNIA, ASSIGNOR TO PARAMOUNT PUBLIX CORPORATION, OF LOS ANGELES, CALIFORNIA, A CORPORATION OF NEW YORK

SHUTTLE PRESSURE PLATE

Application filed September 2, 1930. Serial No. 479,376.

This invention relates to film holding devices and more particularly to such film movements as are used in motion picture cameras through which more than one film is being run; and it is in this connection that I shall describe my invention since its features may thus be better brought out, though I do not intend to be limited thereto.

Particularly in motion picture work it is desirable to run two or more superimposed films past an aperture, as in a camera for purposes of printing or making composite or colored pictures. When printing, a developed positive of the picture to be printed, or in making composite pictures, a processed negative or positive of part of the pictures to be printed, may be the film nearest the lens. In either case the other film or films is or are unexposed and may receive an impression all or in part directly from the film between it or them and the light, or may receive part of its or their impression from the image in the focal plane of the lens. In all of the work it is of paramount importance that the films be in perfect contact so that the images printed are clear and sharp; and also the one film must be in the focal plane of the lens so that images from that source will not be blurred. If either or both conditions are not fulfilled the resultant pictures lack clear definition.

There is a natural tendency for the two films to contact each other only along their centers for they are placed with the emulsion sides together and the normal transverse curvature of the film makes them convex to each other. Hence, I provide a positive means for counteracting this effect whereby the two or more films are brought into perfect contact over the entire exposure area and said area is thus held in focus during the exposure. I accomplish this by imposing upon the films a slight secondary curvature and the slight stresses thus set up in the films are sufficient to cause them to resiliently maintain mutual contact over the entire required area, and also to lie smoothly against the shuttle pressure plate in the focal plane.

In composing trick shots of various types it is desirable that the cameraman be able to see exactly what registers on the film, and especially its relation to whatever may be on the exposed positive. This is accomplished by cutting away the shuttle pressure plate and providing a viewing prism for sighting through the lens. Thus it is a further object of my invention to provide a shuttle that will hold the films in contact with each other and at the same time permit the cameraman a relatively unobstructed view of the image made by the lens.

These and other objects and advantages of my invention may best be understood from the following detailed description and accompanying drawings, in which:—

Fig. 1 is a vertical medial section through an aperture plate and film shuttle constructed in accordance with my invention;

Fig. 2 is an elevation of Fig. 1 as viewed from the right thereof;

Figs. 3 and 4 are diagrammatic views showing the aperture plate and shuttle, the curvature of the parts being exaggerated. Fig. 3 shows the parts in elevation during exposure while Fig. 4 shows them in section during the period of "pull-down".

Fig. 5 is a view similar to Fig. 4 of a variational form of shuttle pressure plate;

Fig. 6 is a vertical section similar to Fig. 1, only with a viewing prism added, showing a variational form of the invention;

Fig. 7 is an elevation of Fig. 6 as viewed from the right thereof;

Fig. 8 is a side elevation of the film shuttle illustrated in Figs. 6 and 7 detached from the rest of the mechanism;

Fig. 9 is an elevation of Fig. 8 as viewed from the right thereof;

Fig. 10 is a fragmentary section along the line 10—10 of Fig. 9 showing a method of attaching the wires to the shuttle plate;

Figs. 11 and 12 are diagrammatic views showing variational wire arrangements in horizontal section, the curvature of the parts being exaggerated.

Figs. 1 and 2 show a film movement such as may be used in a camera, but for sake of clearness it is shown removed from the camera or projection device and those parts not essential to an understanding of my invention are not illustrated. The numeral 10 indicates an aperture plate with photographic aperture 11, said aperture being normally between the lens (not shown) and the film F. The film plate 12 is attached at right angles to one edge of aperture plate 10 and extends rearwardly therefrom. Pin 14 is attached to plate 12 by means of flange 15, and extends at right angles thereto and parallel to plate 10. Rotatably mounted on pin 14 is yoke 16 comprising a sleeve 16a and upwardly extending arms 16b.

Pivotally mounted between the upper ends of arms 16b, is the shuttle, generally designated at 20, that includes a front plate 21, a back or pressure plate 22, and brackets 23 extending at right angles from opposite edges of pressure plate 22 that are pivoted to arms 16b, as may be seen more clearly by reference to Figs. 8 and 9. The front and back plates are secured together by screws 25, proper spacing being obtained by means of washers 26. Extending outwardly from front plate 21 and opposite to brackets 23, are smaller brackets 27 that are pivotally secured to the arms of yoke 28 rotatably mounted on pin 30 carried on frame plate 12. Yoke 28 is similar to yoke 16 except that it may be smaller since it serves as a guide to define the motion of shuttle 20. Aperture plate 10 is recessed at 10a and 10b to permit proper operation of yoke 28 and shuttle 20.

One of the arms 16b carries an extension 31 that passes through an arcuate slot 32 in plate 12. By means of any conventional mechanism, acting upon extension 31, yoke 16 may be oscillated about pin 14, and the shuttle 20 in turn reciprocates in a substantially horizontal path toward and away from aperture 11. When the shuttle is in the rearward position, the film between the front and pressure plates is free and may be pulled past the aperture, hence this is the period of "pull-down". When the shuttle is in the forward position as illustrated in Figs. 1 and 6, the film is held ready for exposure. As the shuttle moves forward registering pins 35 position the film accurately with respect to aperture 11. The central portion of front plate 21 is cut away so that at the end of the movement the film comes in contact with the aperture pressure plate 36 which forms a narrow raised marginal wall entirely around the aperture. The film is thus held at all four sides of the exposure area between aperture pressure plate 36, and shuttle pressure plate 22 which is solid, the latter plate heretofore being a plane surface designed to hold the film in the focal plane of the lens. It will be appreciated, however, that only at the margin of the photographic aperture is the film positively held and the natural tendency to curl causes the films F and F' to assume a wavy or irregular position within the exposure area so that not only are they not in mutual contact due to distortion of the printing film F but the unexposed film F' may not remain in contact with the shuttle pressure plate and, hence, in the focal plane.

It is to be understood that the camera mechanism so far described is known in the art and I lay no claim to it as such, but have described it in some detail that the features of my invention might be more easily and comprehensively set forth; and it will be understood that my invention is not to be held as limited thereto.

To overcome this tendency for the films not to lie flat against each other, I impose a slight curvature upon them while held in exposure position. This is accomplished by curving the vertical walls 36a of the aperture pressure plate convexly toward the film and providing a complementary concave surface on shuttle pressure plate 22. This is shown diagrammatically in Figs. 3 and 4 in which the parts are shown in elevation and with the curvature exaggerated. In Fig. 3 the shuttle is shown in exposure position with the film securely held between the aperture pressure plate and the shuttle pressure plate. The curve impressed on the film shapes it like a section of a cylindrical wall and the resultant strain set up causes the central portions to flatten out so that the two or more individual strips of film lie flat together and the inner film contacts shuttle pressure plate 22 over its entire area. This curvature need be very little, and indeed is limited by the necessity for keeping film F' substantially within the focal plane of the lens.

It is to be noted that the applied curvature in this form of shuttle is about a horizontal axis, i. e., the curvature is vertical, and, hence, longitudinal of the film. The normal curvature of the free film is horizontal, or transverse of the film. The impressed vertical curvature removes the natural horizontal curvature and makes the film flat in a plane transverse to the film. The induced strain, especially with the edges of the two films clamped together, tends to press the films together and consequently contact takes place over the entire area of exposure. It will thus be seen that while this action is not dependent on the normal horizontal curvature of the film, it is helped rather than hindered by this latter condition.

When shuttle 20 moves to the pull-down position, the film is released so that it may straighten out as shown in Fig. 4. Thus it may be drawn freely through the shuttle to position fresh film. While this straightening of the film is characteristic of and desirable with the vertical curvature shown, it is not necessary when applied horizontal curvature is used as will be described.

A modified form of shuttle pressure plate is illustrated in Fig. 5. In this form, plate 22 is only a frame around the exposure area and carries a flat leaf spring 22s, attached at its upper end only, that is used to support the film in position. A block 29 is adapted to move spring 22s forward and hold the film between it and aperture pressure plate 36a, in which position spring 22s conforms to the curve of block 29 and plate 36a. After block 29 first contacts spring 22s and before the film is fully held, spring 22s elongates as it flattens out, and the lower end moving along the film F' straightens it and presses out any air bubbles between the two films.

With the use of a solid shuttle pressure plate as described, the two clamping surfaces holding the film are continuous around the area of aperture 11. The horizontal edges 36b are beveled to conform to the curvature of edges 36a and hence aid in properly curving the film as it presses against them. If this bevel were omitted the contact between films and between film and pressure plates would not be positively maintained along these edges.

Under some circumstances it may be preferable to use, instead of the vertical curvature described, a horizontal curvature as will be described in connection with a form of shuttle adapted for use with a viewing prism. It will be understood, however, that other combinations of these variational forms than illustrated may be used.

In Figs. 6 and 7 is shown a shuttle mechanism similar to that of Figs. 1 and 2 except for the addition of the viewing prism 40 in the right angle of the tube 41 which is supported by brackets 42 secured to frame plate 12. A pin 43 similar to pin 14 is provided and brackets 44 attached to the ends of pins 43 and 14 supply additional support for the tube 41. Prism 40 enables one to look in the left end of tube 41 as viewed in Fig. 7 and see the image cast by a lens on the film. This obviously necessitates the cutting away of sufficient of the shuttle pressure plate to give an unobstructed view, yet this must not remove the support to the film at this point to such an extent that it is not held in the focal plane. Thus, it is a general object of my invention to provide such a pressure plate and, while this result may be attained in other ways, I show a preferred form.

The central portions of both front plate 21a and pressure plate 22a are cut away leaving a frame around the aperture. A short sleeve 45 is fastened on the inner side of pressure plate 22a and positioned to slide within the enlarged end of tube 41.

To support the film across this space I provide a plurality of bars or wires 50 on the film side of plate 22a as shown in Fig. 9. These may be fastened to the pressure plate in any suitable manner such as shown in Fig. 10 where they are shown as drawn through holes in the plate and the bent ends secured in place by a drop of solder 49. Since wires 50 bear directly against the film to keep it in the focal plane they may be considered to be integral parts of the pressure plate. The arrangement of the wires may be varied but that shown is desirable since it leaves the corners of the area viewed unobstructed and the wires are not likely to be confused with any of the vertical lines of the picture.

When it is desired to give to the film a horizontal curvature in place of a vertical curvature, this arrangement of wires is particularly adaptable. Various methods are diagrammatically shown in Figs. 11 and 12, which show the parts in horizontal section with the curvature exaggerated. The method shown in Fig. 11 involves the use of a horizontally curved pressure plate 22a with a plurality of generally vertical wires 50 of a uniform diameter attached thereto. This gives a convex curve to the film and the aperture pressure plate 36b must be concave to press uniformly against the film. In this case the vertical parts 36a of the aperture pressure plate are straight so that the film is firmly held against the wires 50 which perform the same function as the solid pressure plate 22. The number of wires should be sufficient to keep the film in the focal plane and will depend on the flexibility of the film.

When the shutter is moved to the pull-down position the film will be released as above mentioned, but the curvature may not be entirely removed since the tendency of the shuttle pressure plate is to maintain it. In this case it will not interfere with the motion of the film since any pull on the film will not be opposed to said curvature as when it was in a vertical plane.

Fig. 12 shows another method of impressing the desired horizontal curvature on the film. This includes the use of a straight shuttle presure plate 22b, and changing the effective diameter of wires 50 by some suitable method such as applying sheaths 51 of varying external diameters around wires 50. This curves the film and holds it farthest away from plate 22b at the center. Aperture pressure plate 36b is concave to the film as just described. In this form the curvature is impressed upon the film primarily by the wires 50 rather than by the shape of the shuttle pressure plate.

Contact against the film is provided continuously around the aperture by pressure plate 36. The horizontal edges are concave as shown to press the film against wires 50 or sheaths 51, while the vertical or noncurved edges 36a are beveled as before described in order to help maintain the proper curvature of the film. The contacting surfaces on the shuttle pressure plate are continuous along the vertical edges of aperture 11 while the spacing of the bars 50 is such as to give the effect of continuous horizontal contact. The resiliency of the film is of course sufficient to hold films F and F' in contact across the spaces intervening between wires 50. Hence, with all types of shuttle the film may be considered as clamped between continuous surfaces entirely around aperture 11.

From the foregoing it may be seen that the general characteristics of all forms are the same and all embody means for impressing upon the films a definite curvature that counteracts their natural tendency to curl and so separate; but instead causes them to resiliently press against each other. A curved press plate may be used on the shuttle to hold the fresh film in the focal plane but when it is desired to see through the plate it may be cut away so that only a supporting grid is used, in which case the grid itself may be primarily the means for curving the film.

It will be understood the drawings and description are to be considered merely as illustrative of and not restrictive on the broader claims appended hereto, for various changes in design, structure and arrangement may be made without departing from the spirit and scope of said claims.

I claim:—

1. A film holding device comprising an exposure aperture, a curved aperture pressure plate thereabout, a film shuttle adapted to pass two superposed films longitudinally of said films, and a curved pressure plate on said shuttle; said two pressure plates being adapted to impress a curvature on said films over the area of exposure and longitudinally of said films.

2. A film holding device comprising a reciprocating film shuttle adapted to pass therethrough two superposed films, a vertically curved pressure plate on said shuttle, an exposure aperture associated with said shuttle and toward and away from which said shuttle reciprocates, and a vertically curved pressure plate about said aperture; said two pressure plates being adapted to impress a vertical curvature upon said films as said shuttle moves toward said aperture.

3. A film holding device comprising an exposure aperture, a curved aperture pressure plate thereabout, a film shuttle adapted to pass therethrough two superposed films longitudinally of said films, and a curved pressure plate on said shuttle, said two pressure plates being adapted to impress a curvature on said films over the area of exposure and transversely of said films.

4. A film holding device comprising a reciprocating film shuttle adapted to pass therethrough two superposed films, a horizontally curved pressure plate on said shuttle, an exposure aperture associated with said shuttle and toward and away from which said shuttle reciprocates, and a horizontally curved pressure plate about said aperture; said two pressure plates being adapted to impress a horizontal curvature upon said films as said shuttle moves toward said aperture.

5. A film holding device comprising a film shuttle, a pressure plate on said shuttle having a plurality of spaced film supporting bars thereon, an exposure aperture, and a curved pressure plate about said aperture.

6. A film holding device comprising a film shuttle, a pressure plate on said shuttle having a plurality of spaced film supporting bars thereon, an exposure aperture, and a horizontally curved pressure plate about said aperture; said two pressure plates being adapted to impress upon two superposed films clamped therebetween, a curvature transverse of said films.

7. A film holding device comprising a film shuttle, a pressure plate on said shuttle having a plurality of spaced film supporting bars thereon, said bars decreasing in size from the center of said shuttle pressure plate toward the edges thereof, an exposure aperture, and a horizontally curved pressure plate about said aperture, said two pressure plates being adapted to impress a horizontal curvature upon two superposed films held therebetween.

8. A film holding device comprising a film shuttle, a horizontally curved pressure plate on said shuttle having a plurality of spaced film supporting bars thereon, an exposure aperture, and a curved pressure plate about said aperture.

9. In a film exposure apparatus, a film holding device that includes two film holding elements, one of said elements comprising spaced bars in curved surface formation arranged over the film exposure area.

10. In a film exposure apparatus, a film holding device that includes two film holding elements, one of said elements comprising spaced bars in curved surface formation arranged over the film exposure area, and the other of said elements comprising an open frame.

11. In a film exposure apparatus, a film holding device that includes two film holding elements, one of said elements comprising spaced bars in curved surface formation and the other of said elements comprising an open frame, and a viewing optical system behind said film holding elements.

12. In a film exposure apparatus, a film holding device that includes two film holding elements, one of said elements comprising a plurality of spaced film supporting bars arranged over the film exposure area and decreasing in size from the center of the area to the sides thereof, and the other of said elements comprising an open frame curved to press film into contact with the bars.

13. In a film exposure apparatus, a film holding device that includes two film holding elements, one of said elements comprising a plurality of spaced film supporting bars arranged over the film exposure area and decreasing in size from the center of the area to the sides thereof, and the other of said elements comprising an open frame curved to press film into contact with the bars, and a viewing optical system behind said film holding elements.

14. A film holding device comprising a reciprocating film shuttle adapted to pass therethrough two superposed films, a curved pressure plate on said shuttle, an exposure aperture associated with said shuttle and toward and away from which the shuttle reciprocates, and raised marginal walls about said aperture, the top surfaces of said walls being curved to conform to the curvature of the shuttle pressure plate; said walls and pressure plate being adapted to impress a curvature upon said films as said shuttle moves toward said aperture.

15. A film holding device comprising a reciprocating film shuttle adapted to pass therethrough two superposed films, a pressure plate on said shuttle comprising a plurality of bars arranged to contact the films in a curved plane, an exposure aperture associated with said shuttle and toward and away from which the shuttle reciprocates, and raised marginal walls about said aperture, the top surfaces of said walls being curved to conform to the curvature of said plane; said bars and said walls being adapted to impress a curvature upon said films as the shuttle moves toward the exposure aperture.

16. A film holding device comprising a reciprocating film shuttle adapted to pass therethrough two superposed films, a pressure plate on said shuttle comprising a plurality of film supporting bars arranged to provide film contacting points in a curved plane over the area of exposure; an exposure aperture associated with said shuttle and toward and away from which the shuttle reciprocates, and raised marginal walls about said aperture, the top surfaces of said walls being curved to conform to the curvature of said plane; said walls and bars being adapted to impress a curvature upon the films over the exposure area by clamping the films together around the exposure area and supporting the film in a curved plane over the exposure area.

17. In combination with a film exposure apparatus adapted to pass and expose two superposed strips of motion picture film which pass through said apparatus longitudinally of said films, means for clamping the said two films in surface contact with each other in a curved plane, comprising a stationary curved pressure plate, a movable shuttle, a curved shuttle pressure plate, and a curved resilient film engaging member adapted by movement of the shuttle pressure plate to progressively press the films into initial contact, said two pressure plates being adapted to clamp the films therebetween to impress a curvature on the films.

18. A film holding device comprising an exposure aperture, a curved aperture pressure plate thereabout, a film shuttle adapted to pass two superposed films longitudinally of said films, a curved pressure plate on said shuttle, said two pressure plates being adapted to impress a curvature on said films over the area of exposure and longitudinally of said films, and a curved resilient film engaging member adapted by movement of the shuttle to progressively press the two films into intimate initial contact before said curvature is impressed upon the films.

In witness that I claim the foregoing I have hereunto subscribed my name this 13th day of October, 1931.

ALEXANDER FARCIOT EDOUART.